United States Patent Office 3,413,297
Patented Nov. 26, 1968

3,413,297
PROCESS FOR THE PREPARATION OF 2-METHYL-3 - HYDROXY - 4,5 - DISUBSTITUTED-PYRIDINES VIA 5 - LOWER ALKOXYOXAZOLYL-(4)-ACETIC ACID ESTERS
Takuichi Miki, Amagasaki, and Taisuke Matsuo, Suita, Japan, assignors to Takeda Chemical Industries, Ltd., Osaka, Japan
No Drawing. Continuation of application Ser. No. 483,309, Aug. 27, 1965. This application May 22, 1967, Ser. No. 640,334
Claims priority, application Japan, Sept. 2, 1964, 39/50,128; Oct. 16, 1964, 39/59,012; Dec. 16, 1964, 39/71,160; Mar. 11, 1965, 40/14,357
5 Claims. (Cl. 260—294.9)

ABSTRACT OF THE DISCLOSURE

New 5-lower-alkoxyoxazolyl-(4)-acetic acids and their esters of the formula:

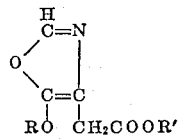

wherein R is a lower alkyl radical having up to 4 carbon atoms and R' is hydrogen or a lower alkyl radical having up to 4 carbon atoms show interesting activities with respect to the central nervous system, for example, sedative effect, anticonvulsive effect, etc. These compounds are also useful as valuable intermediates in the improved synthesis of 2-methyl-3-hydroxy-4,5-disubstituted-pyridines, which are themselves useful intermediates in the preparation of vitamin $B_6$.

The aforesaid new compounds are prepared by intimately admixing lower alkyl N-formylaspartate with an acidic dehydrating agent.

---

This application is a continuation of copending application, Ser. No. 483,309, filed Aug. 27, 1965, now abandoned.

This invention relates to new and useful oxazoles and to the production thereof. In brief, this invention provides new 5-lower-alkoxyoxazolyl-(4)-acetic acids and their esters of the formula:

wherein R is a lower alkyl radical having up to 4 carbon atoms and R' is hydrogen or a lower alkyl radical having up to 4 carbon atoms. These novel compounds show interesting activities with respect to the central nervous system, for example, sedative effect, anticonvulsive effect, etc. Further, these compounds are also useful as valuable intermediates in the synthesis of 2-methyl-3-hydroxy-4,5-disubstituted-pyridines, which are themselves known as useful intermediates in the preparation of vitamin $B_6$, in a higher yield and in a lesser number of steps in comparison with the hitherto-known process for the production of the same.

It is a principal object of the present invention to provide the compounds represented by the Formula I, which are novel and therapeutically useful as showing activity on the central nervous system, for example sedative effect, anti-convulsive effect, etc., and also as intermediates in the preparation of vitamin $B_6$, and also to provide a process for the production thereof.

A further object is to provide a new and industrially advantageous process for producing vitamin $B_6$.

Other objects will be apparent from the detailed description of this invention hereinafter provided.

In accordance with the present invention, the lower alkyl 5-lower alkoxyoxazolyl-(4)-acetates are prepared by intimately contacting a lower alkyl N-formyl-aspartate with an acidic dehydrating agent, e.g., phosphoric anhydride, polyphosphoric acid, etc. The "lower alkyl" mentioned above comprises methyl, ethyl, propyl, isopropyl or butyl, for example. Though the reaction proceeds in a suitable solvent (e.g., halogenated hydrocarbons such as chloroform, carbon tetrachloride or ethylene chloride, hydrocarbons such as benzene, toluene or hexane, ethers such as tetrahydrofuran or dioxane), the presence of such a solvent is not essential but may even be rather undesirable in some cases. The reaction may be carried out at room temperature (e.g., 20 to 30° C.), but, if desired, it may be accelerated by heating at 50–80° C., for example.

Thus, lower alkyl 5-lower alkoxyoxazolyl-(4)-acetate is obtained and this compound may be converted, if desired, to the corresponding 5-lower alkoxyoxazolyl-(4)-acetic acid by a subsequent hydrolysis with an alkaline agent. The hydrolysis is performed in an alkaline solution of alkali metal hydroxides (e.g., sodium hydroxide, potassium hydroxide) or alkaline earth metal hydroxides (e.g., calcium hydroxide) in a solvent such as a lower alcohol (e.g., methanol, ethanol, etc.), water or a mixture thereof. This reaction may be accelerated by heating; if desired, it may be carried out at room temperature or under cooling. Upon neutralization of the reaction mixture with an acid such as sulfonic acid, hydrochloric acid, acetic acid, etc., the objective 5-lower alkoxyoxazolyl-(4)- acetic acid is obtained. At the neutralization, care should be taken not to add excess acid, because the oxazole ring is unstable under strongly acid conditions.

The products of the present invention are useful as valuable intermediates in the synthesis of vitamin $B_6$. That is, 5-lower alkoxyoxazolyl-(4)-acetic acid, for example, is allowed to react with an ethylenic compound represented by the formula:

(II)

wherein each of X and Y is cyano, hydroxymethyl, carboxyl or a lower alkoxycarbonyl radical, to obtain 2-methyl-3-hydroxy - 4,5-disubstituted-pyridine represented by the formula:

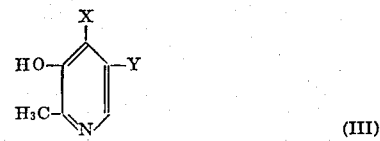

(III)

wherein each of X and Y is the same as above. This reaction can be carried out in the presence of a suitable solvent such as water, alcohols (e.g. methanol, ethanol, propanol, etc.), ketones (e.g. acetone, methyl ethyl ketone, etc.), halogenated hydrocarbons (e.g., chloroform, dichloroethane, etc.), nitriles (e.g., acetonitrile, etc.), ethers (e.g., dimethyl ether, diethylether, dioxane, etc.), but the presence of such a solvent is not essential in carrying out the process of this reaction. Particularly, using fumaronitrile for example as the ethylenic compound, the objective compound can be obtained in better yield in the reaction without employing a solvent than in the case where a solvent is employed. The reaction of (I) and (II) can be accelerated by the presence of a base such as ammonia, methylamine, dimethylamine, trimethylamine, etc. The reaction can be completed by permitting the reactants to stand at room temperature for about one day or longer, or by heating the reactants for several hours, and by contacting the reactants with acidic catalyst, e.g. sulfonic acid, hydrochloric acid, formic acid, acetic acid, etc., if required. In the reaction mentioned above, as the decarboxylation occurs concurrently with the condensation reaction, the pyridine compounds (III) are obtainable in better yield compared with hitherto known methods and, when alkyl maleate or alkyl fumarate is used as the ethylenic compound (II), the reaction is completed immediately without using an acidic catalyst.

It should, of course, be understood that the resulting compounds: 2 - methyl-3-hydroxy-4,5-disubstituted-pyridines (III), can be converted to vitamin $B_6$ in accordance with methods per se well-known in the art.

It is to understood that the following examples are solely for the purpose of illustration and are not to be construed as limitations of this invention, and that many variations may be resorted to without departing from the spirit and scope of this invention. In the examples, "g.," "ml.," "m$\mu$" and "cm.$^{-1}$" are "gram," "milliliter," "millimicrons" and wave number "per centimeter," respectively. Temperatures are all uncorrected, and percentages are all on the weight basis.

EXAMPLE 1

Ethyl 5-ethoxyoxazolyl-(4)-acetate 80 ml. of ethylene chloride is added to a mixture of 14 g. of phosphoric acid anhydride and a diatomaceous earth (powder). A solution of 10 g. of diethyl N-formylaspartate in 10 ml. of ethylene chloride is added to the mixture under vigorous agitation at 50–55° C., taking about one hour. The resulting mixture is agitated for 4 hours. After being cooled, the mixture is rendered weakly alkaline by the addition of an aqueous solution of sodium hydrogen carbonate.

The resulting mixture is shaken with methylene chloride, and the methylene chloride layer is dried and then concentrated. Distillation of the residue gives 1.5 g. of a starting compound and 5.6 g. of ethyl 5-ethoxyoxazolyl-(4)-acetate as a colorless solution boiling at 86–90° C. (1 mm. Hg).

Ultraviolet absorption:

$$\lambda_{max.}^{ethanol} \ 223.5 \ m\mu \ (\epsilon=4,700)$$

Infrared absorption:

$\nu_{max.}^{Nujol}$ 1510 cm.$^{-1}$, 3100 cm.$^{-1}$ (C=C), 1670 cm. (C=N), 1740 cm.$^{-1}$ (—COOC$_2$H$_5$)

EXAMPLE 2

5-ethoxyoxazolyl-(4)-acetic acid

A solution of 3 g. of potassium hydroxide in a mixture of 3 ml. of water and 15 ml. of methanol is added to a solution of 10 g. of ethyl 5-ethoxyoxazolyl-(4)-acetate in 5 ml. of methanol under stirring at room temperature, taking about one hour. After stirring the mixture for 30 minutes, the methanol is evaporated under reduced pressure, and the resulting solution is neutralized with 20% sulfuric acid solution, and shaken with ethyl acetate. The ethyl acetate layer is dried with sodium sulfate and concentrated to obtain 7 g. of crude crystals of 5-ethoxyoxazolyl-(4)-acetic acid. The crude crystals are recrystallized from benzene to give plates melting at 80–81° C.

EXAMPLE 3

4,5-dicyano-3-hydroxy-2-methylpyridine (1) A solution of 0.50 g. of 5-ethoxyoxazolyl-(4)-acetic acid and 0.23 g. of fumaronitrile in 4 ml. of chloroform is boiled on the water bath for 2 hours and then the solvent is evaporated off under reduced pressure. To the residue is added water to obtain a clear aqueous solution and the resulting solution is weakly acidified by the addition of dilute sulfuric acid. The weakly acid solution is mixed and shaken with ether. The ether layer is concentrated to give a solid substance, which is recrystallized from ether-benzene to give 4,5-dicyano-3-hydroxy-2-methylpyridine as colorless crystals containing crystal-water, melting at 89° C. Yield 0.310 g. (60%). The crude crystals are recrystallized from benzene with dehydration to obtain anhydrous crystals melting at 190° C.

(2) A mixture of 0.50 g. of 4-carboxymethyl-5-ethoxyoxazole and 0.23 g. of fumaronitrile is kept at 50–60° C. for 60 minutes, and then the reaction mixture is dissolved in 1 ml. of methanol. 0.3 g. of 35% methanolic hydrochloric acid is added to the solution, and the mixture is left as it is to obtain 0.44 g. of 4,5-dicyano-3-hydroxy-2-methylpyridine as a crystal hydrate melting at 89° C. Yield 75%.

EXAMPLE 4

4-cyano-3-hydroxy-5-hydroxymethyl-2-methylpyridine

A solution of 0.50 g. of 5-ethoxyoxazolyl-(4)-acetic acid and 0.73 g. of $\gamma$-hydroxy-crotonitrile in 4 ml. of methanol is boiled on the water-bath for 2 hours and then the solvent is removed from the reaction mixture by distillation. To the residue are added a calculated volume of dilute hydrochloric acid and of methanol, and the mixture is left overnight. Then methanol and water are added to the solution and the mixture solution is left as it is to obtain crystals of 4-cyano-3-hydroxy-5-hydroxymethyl-2-methylpyridine hydrochloride melting at 190° C.

EXAMPLE 5

4,5-dicarbomethoxy-3-hydroxy-2-methylpyridine

A mixture of 0.50 g. of 5-ethoxyoxazolyl-(4)-acetic acid and 0.84 g. of dimethyl maleate (or dimethyl fumarate) is heated at 110° C. for 2 hours. After cooling, the reaction mixture is recrystallized from benzene to obtain 0.60 g. of 4,5-dicarbomethoxy-3-hydroxy-2-methylpyridine as colorless needles melting at 140–141° C. Yield 91%.

*Elementary analysis.*—Calculated for C$_{10}$H$_{11}$NO$_5$: C, 53.33; H, 4.92; N, 6.72. Found: C, 53.54; H, 4.81; N, 6.77.

EXAMPLE 6

(1) Methyl 5-methoxyoxazolyl-(4)-acetate 70 ml. of ethylene chloride is added to a mixture of 12 g. of phosphoric acid anhydride and a diatomaceous earth (powder). A solution of 10 g. dimethyl N-formylaspartate in 10 ml. of ethylene chloride is added to the mixture under vigorous agitation at 50–55° C., taking about one hour. The resulting mixture is agitated for 4 hours. After being cooled, the mixture is rendered weakly alkaline by the addition of an aqueous solution of sodium hydrogen carbonate.

The resulting mixture is shaken with methylene chloride and the methylene chloride layer is concentrated. Distillation of the residue gives 1.3 g. of starting compound and 6.4 g. of methyl 5-methoxyoxazolyl-(4)-acetate as a colorless solution boiling at 82–85° C. (1 mm. Hg). Yield 70%.

(2) 5-methoxyoxazolyl-(4)-acetic acid

A solution of 1.7 g. of potassium hydroxide in a mixture of 3 ml. of water and 15 ml. of methanol is added to a solution of 5 g. of methyl-5-methoxyoxazolyl-(4)-acetate in 5 ml. of methanol under stirring at room temperature, taking about one hour. After stirring the mixture for 30 minutes, the methanol is evaporated under reduced pressure, and the resulting solution is neutralized with 20% sulfuric acid solution, and shaken with ethyl acetate. The ethyl acetate layer is dried with sodium sulfate and concentrated to obtain 4 g. of crude crystals of 5-methoxyoxazolyl-(4)-acetic acid. The crude crystals are recrystallized from benzene to give colorless plates melting at 77–78° C. Yield 87%.

(3) 4,5-dicyano-3-hydroxy-2-methylpyridine 0.43 g. of 4,5-dicyano-3-hydroxy-2-methylpyridine is obtained in a manner similar to that of Example 3(2) from 0.50 g. of 4-carboxymethyl-5-methoxyoxazole and 0.25 g. of fumaronitrile. Yield 75%.

(4) 4,5-dicarbomethoxy-3-hydroxy-2-methylpyridine 0.65 g. of 4,5-dicarbomethoxy-3-hydroxy-2-methylpyridine is obtained in a manner similar to that of Example 5 from 0.50 g. of 4-carboxymethyl-5-methoxyoxazole and 0.92 g. of dimethylmaleate (or dimethyl fumarate). Yield 96%.

What we claim is:

1. A process for producing a compound of the formula:

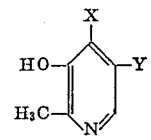

wherein each of X and Y is a member selected from the group consisting of cyano, hydroxymethyl, carboxyl and lower alkoxycarbonyl, which comprises the step of (a) intimately contacting lower alkyl N-formylaspartate with an acidic dehydrating agent to produce a compound of the formula:

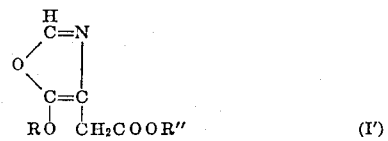   (I')

wherein each of R and R'' is lower alkyl, and (b) hydrolyzing the compound (I') with an alkaline agent to produce a compound of the formula:

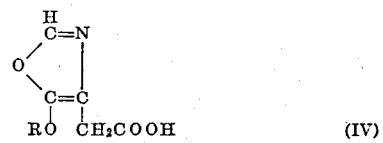   (IV)

wherein R is the same as above, and concomitantly bringing the resulting compound (IV) into intimate contact with a compound of the formula:

   (III)

wherein X and Y are the same as above, to produce the objective 2-methyl-3-hydroxy-4,5-disubstituted-pyridine (III).

2. A process according to claim 1, wherein the reaction of step (b) is performed in the absence of a solvent.

3. A process according to claim 1, wherein the reaction of step (b) is performed in the absence of acid catalyst.

4. A process according to claim 1, wherein the reaction of step (b) is performed in the presence of acid catalyst.

5. A process for producing a compound of the formula:

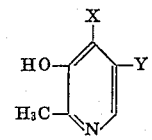

wherein each of X and Y is lower alkoxycarbonyl, which comprises intimately contacting a compound of the formula

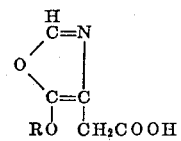

wherein R is a lower alkyl, with a compound of the formula:

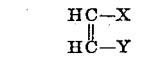

wherein X and Y are as precedingly defined, in the absence of acid catalyst.

References Cited
UNITED STATES PATENTS
3,227,721   6/1966   Pfister et al. _____ 260—297
3,227,724   6/1966   Pfister et al. _____ 260—295.5

OTHER REFERENCES
Noller: Chemistry of Organic Compounds, second edition, Saunders (1957), p. 170.

Von Doering: J. Am. Chem. Soc., vol. 72, pp. 143–147 (1950).

HENRY R. JILES, *Primary Examiner.*

A. L. ROTMAN, *Assistant Examiner.*